US011078944B2

(12) United States Patent
Lepper et al.

(10) Patent No.: US 11,078,944 B2
(45) Date of Patent: Aug. 3, 2021

(54) LINEARLY-ADJUSTABLE CLIP ASSEMBLY

(71) Applicant: Illinois Tool Works Inc., Glenview, IL (US)

(72) Inventors: Mark Owen Lepper, Oak Park, IL (US); Eric David Kendall, Rochester Hills, MI (US)

(73) Assignee: Illinois Tool Works Inc., Glenview, IL (US)

( * ) Notice: Subject to any disclaimer, the term of this patent is extended or adjusted under 35 U.S.C. 154(b) by 436 days.

(21) Appl. No.: 16/081,098

(22) PCT Filed: Feb. 22, 2018

(86) PCT No.: PCT/US2018/019093
§ 371 (c)(1),
(2) Date: Aug. 30, 2018

(87) PCT Pub. No.: WO2018/175031
PCT Pub. Date: Sep. 27, 2018

(65) Prior Publication Data
US 2020/0232495 A1    Jul. 23, 2020

Related U.S. Application Data

(60) Provisional application No. 62/475,348, filed on Mar. 23, 2017.

(51) Int. Cl.
*F16B 21/08* (2006.01)
*F16B 5/06* (2006.01)
*F16B 21/07* (2006.01)

(52) U.S. Cl.
CPC .......... *F16B 21/086* (2013.01); *F16B 5/0628* (2013.01); *F16B 21/073* (2013.01); *F16B 5/0657* (2013.01); *F16B 5/0664* (2013.01)

(58) Field of Classification Search
CPC .... F16B 5/0628; F16B 5/0657; F16B 21/086; F16B 21/088; F16B 21/073
See application file for complete search history.

(56) References Cited

U.S. PATENT DOCUMENTS 4,250,599 A * 2/1981 Nagashima ........... F16B 5/0628
24/326
4,402,118 A * 9/1983 Benedetti ................ F16B 5/065
24/289

(Continued)

FOREIGN PATENT DOCUMENTS

CN       101076675 A    11/2007
CN       204340912 U     5/2015

(Continued)

OTHER PUBLICATIONS

International Search Report and Written Opinion for PCT/US2018/019093.

*Primary Examiner* — Victor D Batson
*Assistant Examiner* — Amit Singh Dhillon
(74) *Attorney, Agent, or Firm* — Quarles & Brady LLP

(57) ABSTRACT

A clip assembly is configured to adjustably secure to a first component and a second component. The clip assembly includes a rail member that is configured to connect to the first component, and an attachment member that is configured to connect to the second component. The rail member is linearly adjustable in relation to the attachment member.

20 Claims, 6 Drawing Sheets

(56) References Cited

U.S. PATENT DOCUMENTS

| | | | |
|---|---|---|---|
| 4,865,505 A | 9/1989 | Okada | |
| 5,533,237 A * | 7/1996 | Higgins | F16B 5/065 24/289 |
| 5,542,158 A * | 8/1996 | Gronau | F16B 5/065 24/289 |
| 6,527,471 B2 * | 3/2003 | Smith | F16B 2/20 403/291 |
| 7,475,934 B2 * | 1/2009 | Sato | F16B 17/006 296/146.7 |
| 7,740,432 B2 * | 6/2010 | Harada | F16B 21/065 411/45 |
| 9,180,804 B2 | 11/2015 | Tsunoda | |
| 9,475,525 B2 | 10/2016 | Lepper | |
| 2003/0102680 A1 | 6/2003 | Sedlock et al. | |
| 2004/0049893 A1 * | 3/2004 | Bodo | F16B 5/065 24/293 |
| 2005/0097851 A1 * | 5/2005 | Lubera | F16B 5/065 52/698 |
| 2007/0116537 A1 * | 5/2007 | Glovak | F16B 21/088 411/45 |
| 2008/0166206 A1 * | 7/2008 | Edland | F16B 21/086 411/510 |
| 2009/0188086 A1 * | 7/2009 | Okada | B60R 13/0206 24/297 |
| 2011/0030177 A1 * | 2/2011 | Ukai | F16B 21/086 24/458 |
| 2011/0203081 A1 * | 8/2011 | Iwahara | F16B 19/1081 24/458 |
| 2011/0314644 A1 * | 12/2011 | Wei | F16B 21/073 24/343 |
| 2012/0174352 A1 * | 7/2012 | Tsunoda | F16B 5/0642 24/530 |
| 2013/0174389 A1 | 7/2013 | Dole | |
| 2015/0026933 A1 * | 1/2015 | Komeno | B60R 13/0206 24/457 |
| 2015/0322985 A1 * | 11/2015 | Scroggie | F16B 5/0084 29/428 |
| 2018/0112699 A1 * | 4/2018 | Ligi, Jr. | F16B 21/086 |
| 2019/0195262 A1 * | 6/2019 | Iwahara | F16B 21/075 |

FOREIGN PATENT DOCUMENTS

| | | | |
|---|---|---|---|
| DE | 10 2008 052965 | 4/2010 | |
| DE | 102008052965 A1 * | 4/2010 | B60J 7/0007 |
| IE | 103 35 220 | 3/2005 | |
| IE | 20 2012 004005 | 8/2012 | |

* cited by examiner

US 11,078,944 B2

LINEARLY-ADJUSTABLE CLIP ASSEMBLY

RELATED APPLICATIONS

This application is a National Phase of International Application No. PCT/US2018/019093, entitled "Linearly-Adjustable Clip Assembly," filed Feb. 22, 2018, which relates to and claims priority benefits from U.S. Provisional Patent Application No. 62/475,348, entitled "Linearly-Adjustable Clip Assembly," filed Mar. 23, 2017, which is hereby incorporated by reference in its entirety.

FIELD OF EMBODIMENTS OF THE DISCLOSURE

Embodiments of the present disclosure generally relate to clip assemblies, and more particularly, to clip assemblies that are configured to be linearly adjusted, such as with respect to linear variation tolerance.

BACKGROUND

During a manufacturing process of a vehicle, various components are connected to one another. For example, doors are connected to a main vehicle frame, tail lights are secured to the frame, and the like. Many vehicles are designed and styled distinctly from other vehicles. Accordingly, the distinct vehicle styles and geometries often require customized fastening assemblies at various locations.

WO 2013/154920, entitled "Arcuate Clip Assembly," and U.S. Pat. No. 9,475,525, entitled "Arcuate Clip Assembly" (both of which are hereby incorporated by reference in their entireties) disclose a pivotally-adjustable clip assembly that is configured to securely connect a first structural component to a second structural component.

As can be appreciated, certain components may need to be adjusted with respect to one another after a clip is secured thereto. However, certain known clips may not allow for the components to be adjusted, particularly in a linear direction.

SUMMARY OF EMBODIMENTS OF THE DISCLOSURE

A need exists for a clip assembly that allows for linear adjustment of components. In particular, a need exists for a clip assembly having portions that may be linearly adjusted in relation to one another.

With those needs in mind, certain embodiments of the present disclosure provide a clip assembly that is configured to adjustably secure to a first component and a second component. The clip assembly includes a rail member that is configured to connect to the first component, and an attachment member that is configured to connect to the second component. The rail member is linearly adjustable in relation to the attachment member.

The rail member may include at least one first component fastener that is configured to securely couple the rail member to the first component. The attachment member may include at least one second component fastener that is configured to securely couple the attachment member to the second component. Optionally, the rail member may be integrally formed with the first component, and/or the attachment member may be integrally formed with the second component.

In at least one embodiment, the rail member includes a rail beam that may include end walls connected to a ledge extending between the end walls. The ledge may include a beveled edge. The ledge may include an inwardly-stepped rectangular edge. The end walls may include stop barriers that prevent the rail member from dislodging from the attachment member. The rail member may include one or more angled support ribs extending from a base to a central fin.

In at least one embodiment, the attachment member includes a rail coupler having opposed coupling brackets separated by a central gap. A portion of the rail member is slidably retained within the central gap between the coupling brackets. Each of the coupling brackets may include end beams connected together by a spanning beam, and a ledge-engaging arm extending from the spanning beam. The ledge-engaging arm is configured to engage a ledge of the rail member. The ledge-engaging arm may include an outwardly-canted tip that conforms to a portion of the ledge.

Certain embodiments of the present disclosure provide a securing system that includes a first component, a second component, and a clip assembly adjustably secured to the first component and the second component. The clip assembly includes a rail member connected to the first component, and an attachment member connected to the second component. The rail member is linearly adjustable in relation to the attachment member.

Figure 1:
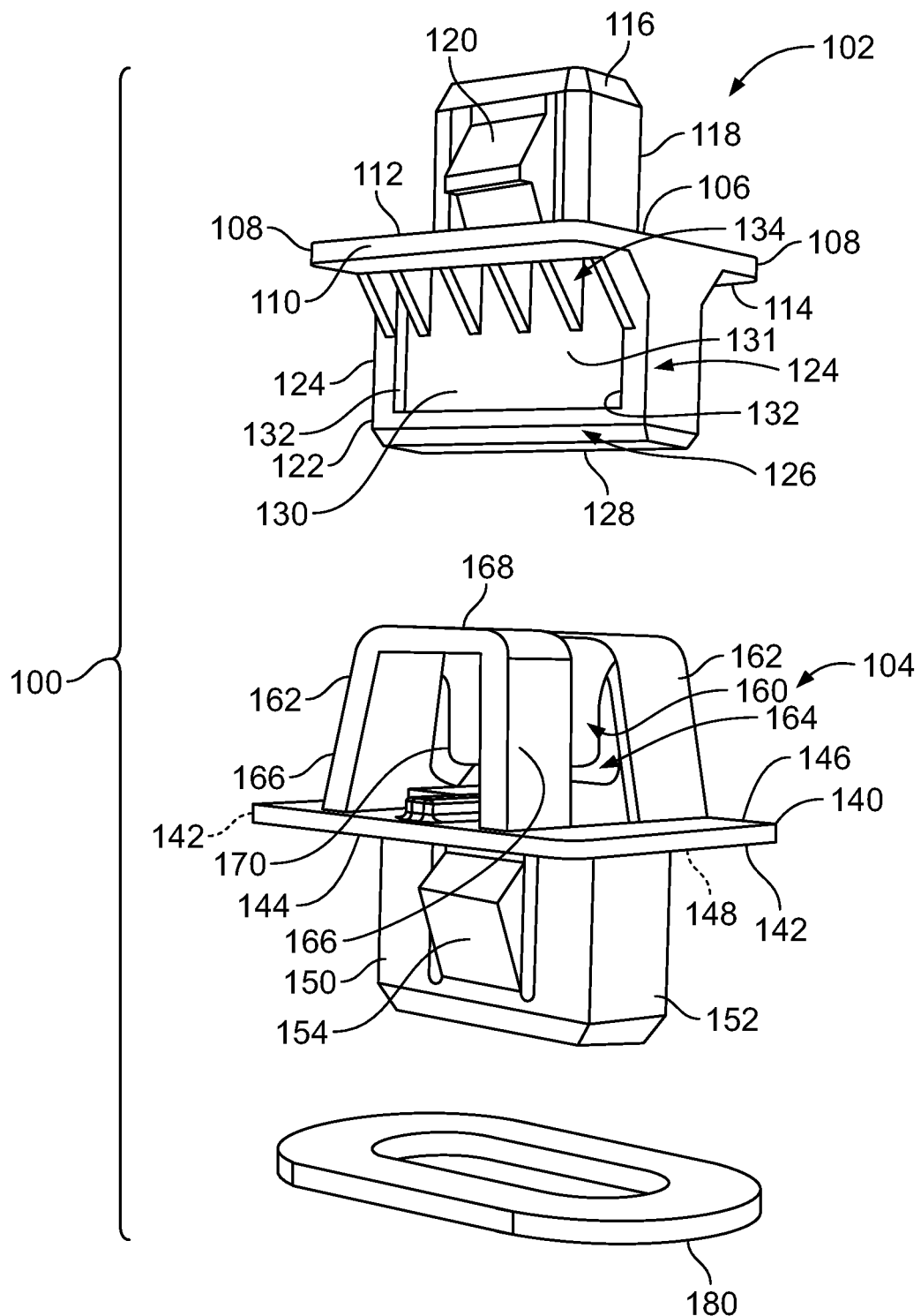
FIG. 1 illustrates a perspective exploded view of a clip assembly according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a clip assembly that is configured to allow for linear adjustment between components. The clip assembly includes an attachment member (for example, a clip) that is configured to couple to a rail member. The rail member is linearly-adjustable relative to the attachment member. That is, the rail member is configured to be linearly adjusted with respect to the attachment member.

The linearly-adjustable clip assembly allows for high linear variation tolerance. That is, the linear adjustment includes linear variation tolerance. The clip assembly may include sealing features. Further, the clip assembly may be formed through simple tooling and manufacturing processes. In at least one embodiment, the rail member (or the attachment member) may be integrally formed with a component, instead of being separately attached to the component.

In at least one embodiment, the linearly-adjustable clip assembly includes an attachment member that couples to a rail member through a linearly-adjustable interface. The rail member includes a rail that is slidably adjustable in linear directions between opposed couplers of the attachment member. The attachment member is configured to be secured to a first component, while the rail member is configured to be secured to a second component, or vice versa. The couplers may include engagement arms that engage the rail.

A seal may be secured to a portion of the attachment member or the rail member. The rail member may include support ribs and end stop walls that prevent the rail member from inadvertently dislodging from the attachment member.

In at least one embodiment, the rail member is coupled to a component, such as through an assembly process, an insert-molding process, or an integral molding and forming process. The attachment or clip member is coupled to another component. The rail member is then mated to the attachment member to secure the components together. The interface between the rail member and the attachment member allows the rail member and the attachment member to be linearly adjusted relative to one another.

The rail member may be integrally formed with a component. Further, the attachment member may include multiple securing features that are configured to securely connect to another component at multiple locations.

FIG. 1 illustrates a perspective exploded view of a clip assembly 100 according to an embodiment of the present disclosure. The clip assembly 100 includes a rail member 102 that is configured to adjustably couple to an attachment member 104.

The rail member 102 includes a base 106, such as a panel, having ends 108 integrally connected to sides 110, a first surface 112, and an opposite second surface 114. A component fastener 116 outwardly extends from the first surface 112. The component fastener 116 may include a stud 118 having lateral ramped prongs 120. The component fastener 116 is configured to securely couple the rail member 102 to a first component. For example, the component fastener 116 may snapably secure into a hole of the first component. The component fastener 116 may include various other fastening interfaces other than shown. For example, the component fastener 116 may include flexible arms, threaded interfaces, and/or the like that are configured to securely connect the rail member 102 to the first component.

A rail beam 122 outwardly extends from the second surface 114 of the base 106 opposite from the component fastener 116. The rail beam 122 may include end walls 124 connected to a ledge 126 extending between the end walls 124. The ledge 126 may include a beveled edge 128. The rail beam 122 may include recessed areas 130 on either side between the base 108, the end walls 124, and the ledge 126. The recessed areas 130 provide the rail beam 122 with a central fin 131. The expanded ledge 126 extends from a distal end of the central fin 131.

The end walls 124 may include internal surfaces 132 facing one another. The internal surfaces 132 provide stop barriers. Optionally, the rail beam 122 may not include the internal surfaces 132 and/or the recessed areas 130.

One or more angled support ribs 134 may extend from the second surface 114 of the base 106 proximate to the sides 110 to the central fin 131. The support ribs 134 bracingly support the base 106 in relation to the rail beam 122. Optionally, the rail member 102 may not include the support ribs 134.

The attachment member 104 includes a base 140, such as a panel, having ends 142 integrally connected to sides 144, a first surface 146, and an opposite second surface 148. A component fastener 150 outwardly extends from the second surface 148. The component fastener 150 may include a stud 152 having lateral ramped prongs 154. The component fastener 150 is configured to securely couple the attachment member 104 to a second component. For example, the component fastener 150 may snapably secure into a hole of the second component. The component fastener 150 may include various other fastening interfaces other than shown. For example, the component fastener 150 may include flexible arms, threaded interfaces, and/or the like that are configured to securely connect the attachment member 104 to the second component.

A rail coupler 160 extends from the first surface 146 opposite from the component fastener 150. The rail coupler 160 includes mirror image coupling brackets 162 separated by a central gap 164. Each coupling bracket 162 may include end beams 166 connected together by a spanning beam 168 that is spaced apart from the first surface 146. A ledge-engaging arm 170 extends inwardly toward the first surface 146 from a central portion of the spanning beam 168. The ledge-engaging arm 170 angles from the spanning beam 168 towards the first surface 146.

A circumferential seal 180 may be secured to the base 140, such as underneath the second surface 148. Optionally, the seal 180 may fit over the first surface 146. In at least one other embodiment, the seal 180 may fit around the base 140. An additional seal may be coupled to the rail member 102, such as over, under, and/or around the base 106. Optionally, only the rail member 102 may include a seal. In at least one other embodiment, the clip assembly 100 does not include any seal.

In operation, the rail coupler 160 of the attachment member 104 slidably retains the rail beam 122 of the rail member 102. In particular, the rail beam 122 is slidably retained between the coupling brackets 162. In this manner, the rail member 102 and the attachment member 104 are able to be linearly adjusted relative to one another.

Figure 2:
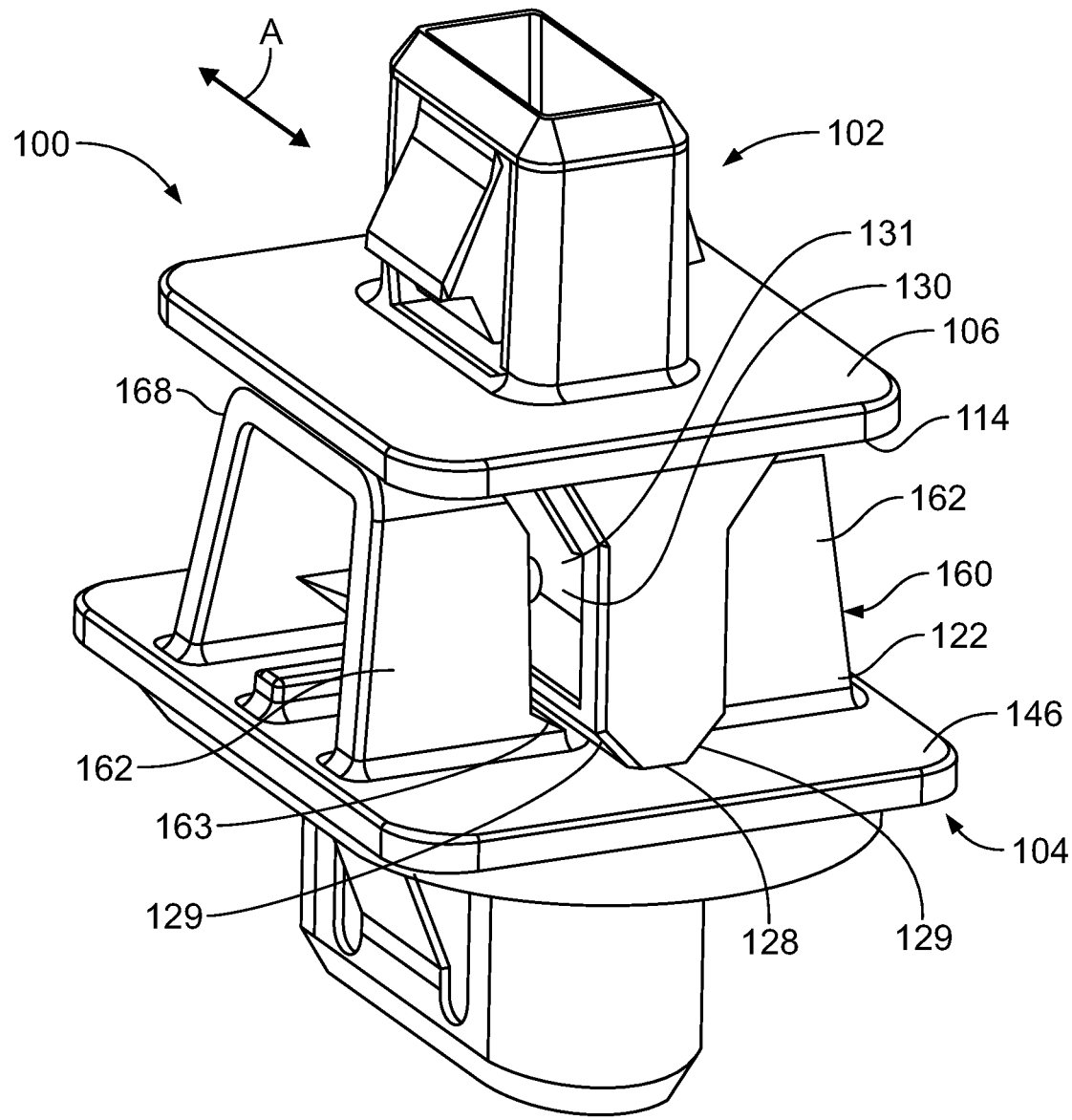
FIG. 2 illustrates a perspective view of a clip assembly including a rail member coupled to an attachment member, according to an embodiment of the present disclosure.

FIG. 2 illustrates a perspective view of the clip assembly 100 including the rail member 102 coupled to the attachment member 104, according to an embodiment of the present disclosure. As shown, the rail beam 122 is slidably retained between the mirror image, opposed coupling brackets 162 of the rail coupler 160. The lower beveled edge 128 of the rail beam 122 may be slidably supported on the first surface 146 of the base 140 of the attachment member 104. Inwardly-angled tips 129 of the rail beam 122 may be slidably supported by reciprocal outwardly-angled lower edges 163 of the coupling brackets 162. The second surface 114 of the base 106 of the rail member 102 may be slidably supported by the spanning beams 168 of the coupling brackets 162. Optionally, the second surface 114 may be spaced apart from the spanning beams 168.

Figure 3:
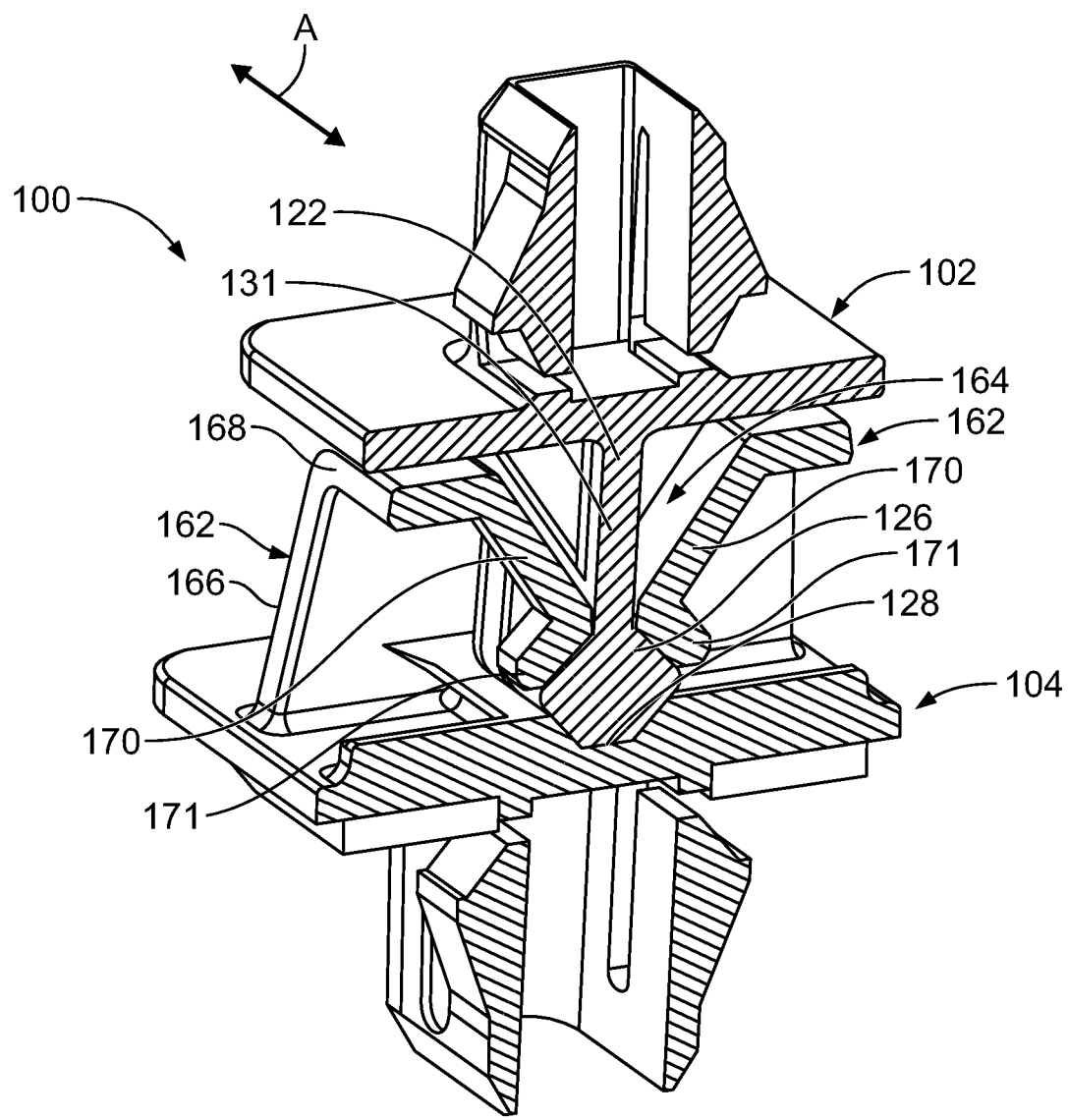
FIG. 3 illustrates a perspective cross-sectional view of a clip assembly including a rail member coupled to an attachment member, according to an embodiment of the present disclosure.

FIG. 3 illustrates a perspective cross-sectional view of the clip assembly 100 including the rail member 102 coupled to the attachment member 104, according to an embodiment of the present disclosure. As shown, the rail beam 122 is slidably retained within the central gap 164 between the opposed coupling brackets 162. The ledge-engaging arms 170 slidably engage (for example, abut) the ledge 126. The ledge-engaging arms 170 may include outwardly-canted tips 171 that conform to an outer upper surface of the ledge 126. The ledge-engaging arms 170 axially support the rail beam 122 within the central gap 164. Alternatively, the coupling brackets 162 may not include the ledge-engaging arms 170.

Referring to FIGS. 1-3, the internal surfaces 132 provide stop barriers that abut into the end beams 166 of the coupling brackets 162 at terminal ends of a sliding range of travel. As the internal surfaces 132 abut into the end beams 166, the rail member 102 is prevented from dislodging from the attachment member 104. Alternatively, the rail beam 122 may not include the stop barriers.

The rail member 102 is slidably coupled to the attachment member 104. Accordingly, the rail member 102 and the attachment member 104 may be linearly adjusted in the directions of arrows A, as the rail member 102 is longitudinally slid relative to the attachment member 104.

Figure 4:
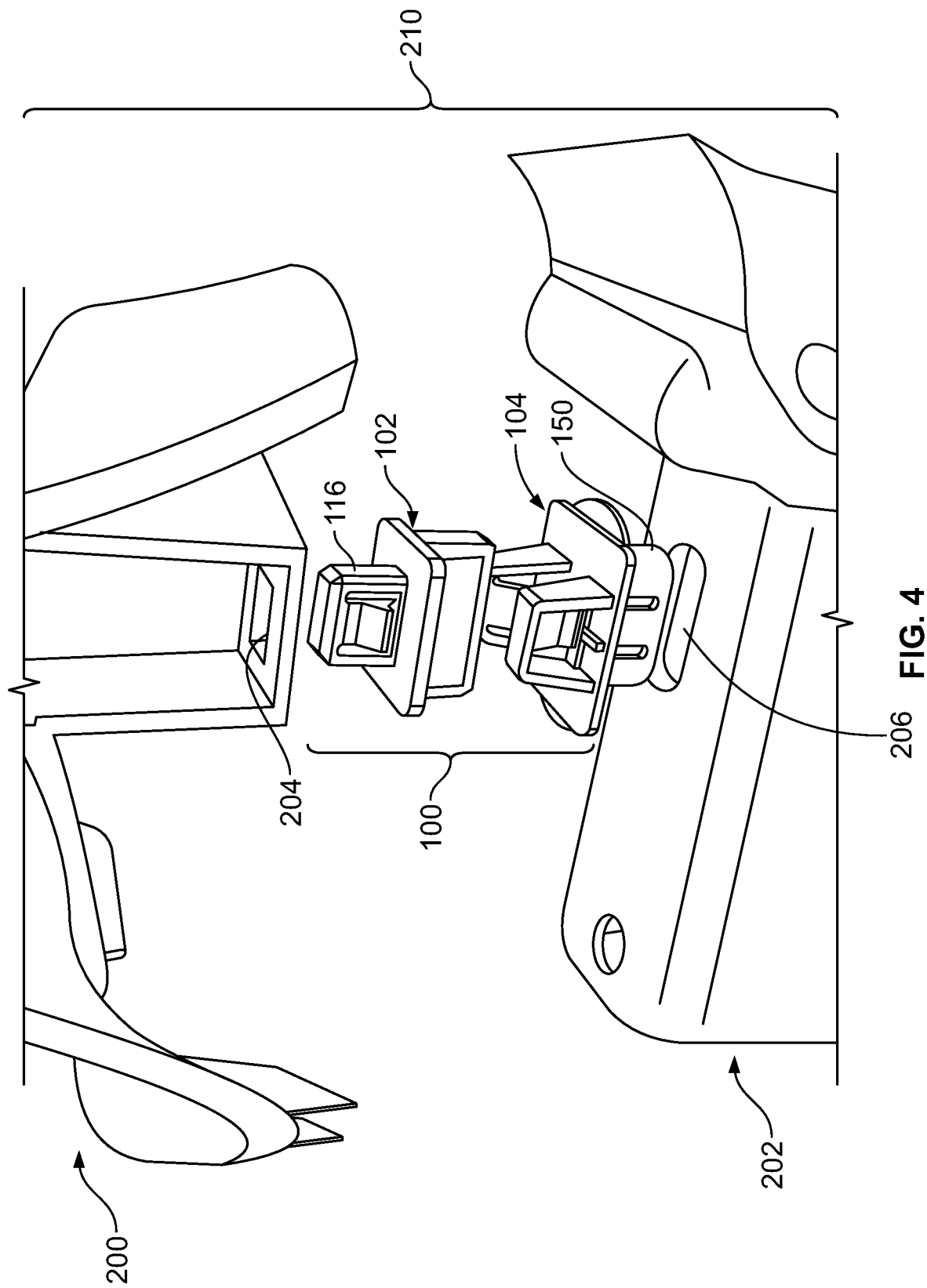
FIG. 4 illustrates a perspective exploded view of a clip assembly in relation to a first component and a second component, according to an embodiment of the present disclosure.

FIG. 4 illustrates a perspective exploded view of the clip assembly 100 in relation to a first component 200 and a second component 202, according to an embodiment of the present disclosure. The clip assembly 100 secures the first component 200 to the second component 202 to form a securing system 210. The first component 200 and the second component 202 may each be a housing, panel, sheet, frame, and/or the like. The rail member 102 secures to the first component 200, such as through the component fastener 116 securing into an opening 204 of the first component 200. Similarly, the attachment member 104 secured to the second component 202, such as through the component fastener 150 securing into an opening 206 of the second component 202. As described herein, the rail member 102 may be linearly adjusted relative to the attachment member 104, to accommodate the positions of the first component 200 in relation to the second component 202.

Figure 5:
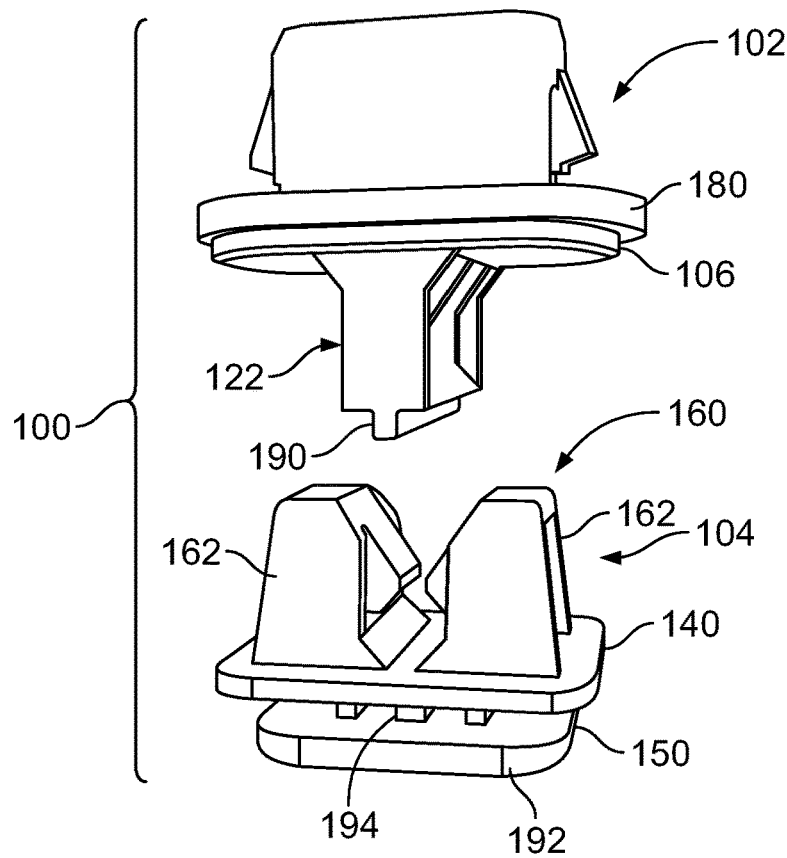
FIG. 5 illustrates a perspective view of a clip assembly in which a rail member is disconnected from an attachment member, according to an embodiment of the present disclosure.

FIG. 5 illustrates a perspective view of a clip assembly 100 in which a rail member 102 is disconnected from an attachment member 104, according to an embodiment of the present disclosure. As shown, the rail member 102 may include a circumferential seal 180 over and/or about the base 106.

Instead of a beveled edge, the rail beam 122 may include an inwardly-stepped rectangular edge 190. The rectangular edge 190 simplifies a manufacturing process by reducing a size of a molding sink for the rail member 102.

Also, the component fastener 150 of the attachment member 104 may include an outer collar 192 connected to a reduced neck section 194, instead of a box prong configuration. The outer collar 192 may be used to connect to a doghouse attachment feature of a component, for example. In at least one embodiment, the component fastener 116 of the rail member 102 may also include an outer collar, similar to that shown for the attachment member 104. In general, the component fasteners 116 and 150 are not limited to those shown. The component fasteners 116 and 150 may be sized, shaped, and configured to connect to components in a wide variety of ways.

Figure 6:
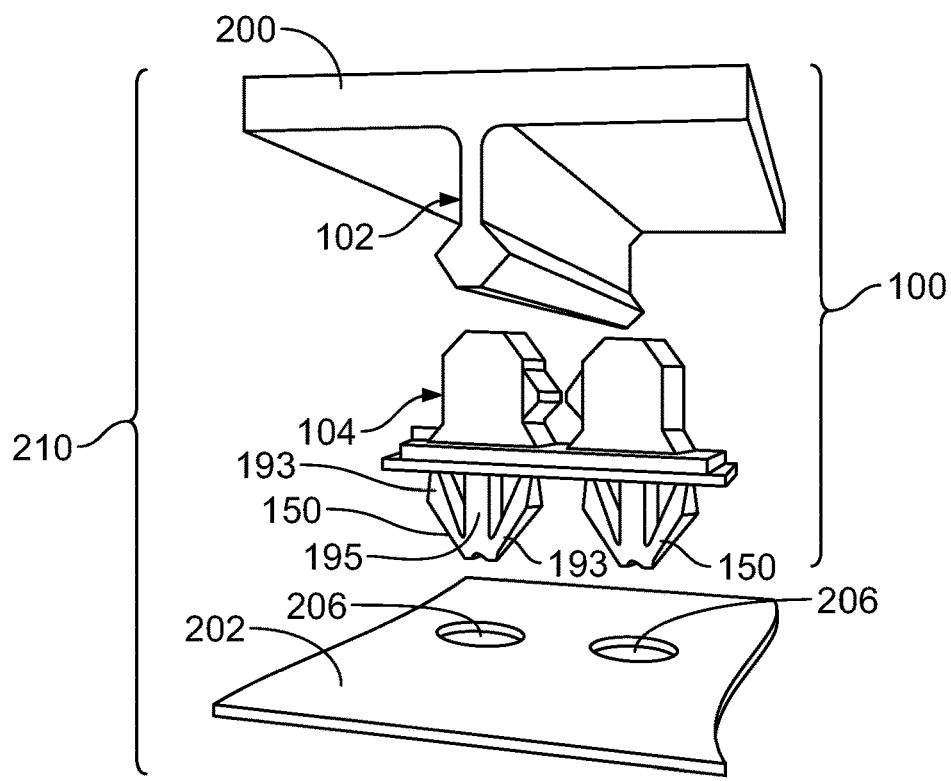
FIG. 6 illustrates a perspective exploded view of a clip assembly, according to an embodiment of the present disclosure.

FIG. 6 illustrates a perspective exploded view of a clip assembly 100, according to an embodiment of the present disclosure. In this embodiment, the rail member 102 may be integrally formed with the first component 200. The attachment member 104 may include two component fasteners 150 that are configured to secure into holes 206 of the second component 202. As shown, the component fasteners 150 may include W-shaped connection interfaces including flexible arms 193 connected to a central column 195.

In at least one other embodiment, the attachment member 104 may be integrally formed with the second component 200. Further, the rail member 102 may be separate and distinct from the first component 100 and include multiple component fasteners, such as those shown with respect to the attachment member 104.

Figure 7:
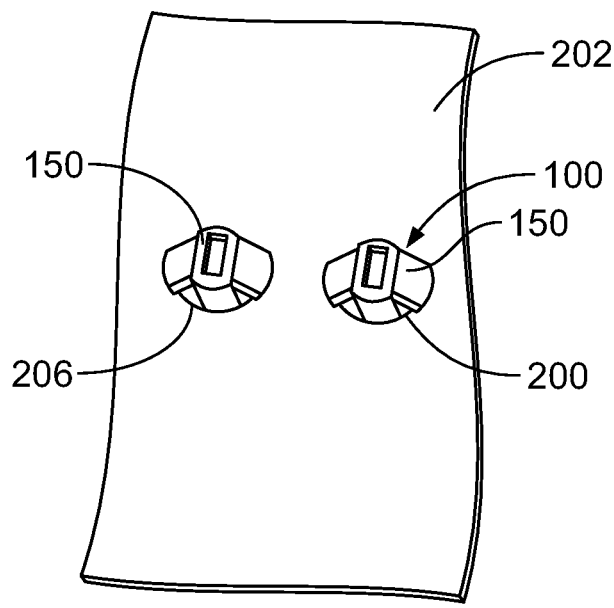
FIG. 7 illustrates a bottom view of a clip assembly secured to a second component, according to an embodiment of the present disclosure.

FIG. 7 illustrates a bottom view of the clip assembly 100 secured to a second component 202, according to an embodiment of the present disclosure. As shown, the component fasteners 150 may each be securely retained within separate and distinct holes 206 of the second component 202.

Figure 8:
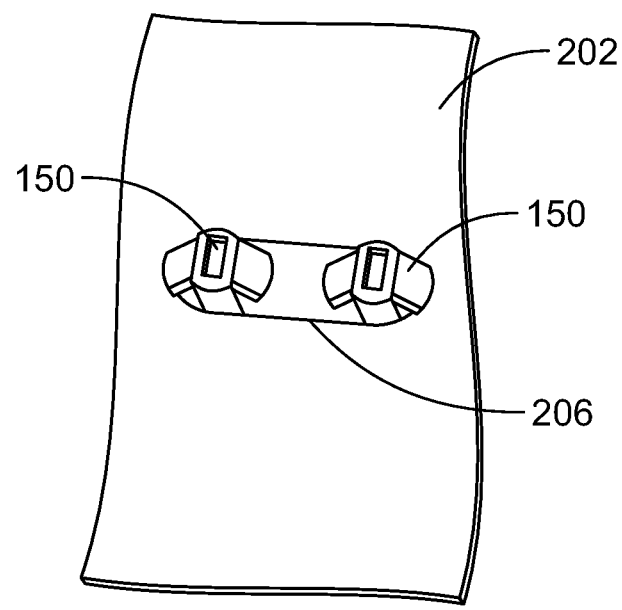
FIG. 8 illustrates a bottom view of a clip assembly secured to a second component, according to an embodiment of the present disclosure.

FIG. 8 illustrates a bottom view of the clip assembly 100 secured to the second component 202, according to an embodiment of the present disclosure. In this embodiment, both component fasteners 150 may be securely retained within a single, expanded hole or slot 206 of the second component 202.

As explained herein, embodiments of the present disclosure provide a clip assembly that is linearly-adjustable. The linearly-adjustable clip assembly is configured to be easily adapted to connect to two different components, such as through a linear adjustment of the components connected to portions of the clip assembly.

Embodiments of the present disclosure provide a linearly-adjustable clip assembly that allows for high linear variation tolerance. As such, the clip assembly allows for an easier and freer assembly process so as to overcome misaligned or offset orientations.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A clip assembly that is configured to adjustably secure to a first component and a second component, the clip assembly comprising:
   a rail member that is configured to connect to the first component; and
   an attachment member that is configured to connect to the second component, the attachment member includes a base having a first surface and a second surface opposite to the first surface, wherein the attachment member further includes a component fastener outwardly extending directly from the second surface of the base, and wherein a rail coupler is unitary with the base and extends from the first surface,
   wherein the rail member is linearly adjustable in relation to the attachment member.

2. The clip assembly of claim 1, wherein the rail member comprises at least one component fastener that is configured to securely couple the rail member to the first component, and wherein the component fastener of the attachment member is configured to securely couple the attachment member to the second component.

3. The clip assembly of claim 1, wherein the rail member is integrally formed with the first component.

4. The clip assembly of claim 1, wherein the attachment member is integrally formed with the second component.

5. The clip assembly of claim 1, wherein the rail member comprises a rail beam having end walls connected to a ledge extending between the end walls.

6. The clip assembly of claim 5, wherein the ledge comprises an inwardly-stepped rectangular edge.

7. The clip assembly of claim 5, wherein the end walls comprise stop barriers that prevent the rail member from dislodging from the attachment member.

8. The clip assembly of claim 5, wherein the rail member further comprises one or more angled support ribs extending from a base of the rail member to a central fin.

9. The clip assembly of claim 1, wherein the rail coupler comprises opposed coupling brackets separated by a central gap, wherein a portion of the rail member is slidably retained within the central gap between the coupling brackets.

10. The clip assembly of claim 9, wherein each of the coupling brackets comprises:
    end beams connected together by a spanning beam; and
    a ledge-engaging arm extending from the spanning beam, wherein the ledge-engaging arm is configured to engage a ledge of the rail member.

11. The clip assembly of claim 10, wherein the ledge-engaging arm comprises an outwardly-canted tip that conforms to a portion of the ledge.

12. The clip assembly of claim 1, wherein the attachment member further comprises an outer collar connected at a reduced neck section, and wherein the outer collar is configured to connect to the second component.

13. A securing system comprising:
    a first component;
    a second component; and
    a clip assembly adjustably secured to the first component and the second component, the clip assembly comprising:
        a rail member connected to the first component; and
        an attachment member connected to the second component, the attachment member having a base and further comprising a rail coupler having opposed coupling brackets separated by a central gap,
        wherein a portion of the rail member is slidably retained within the central gap between the coupling brackets,
        wherein each of the coupling brackets comprises a surface extending from the base and an upper surface connected at a corner with the surface, and wherein the upper surface of each of the coupling brackets is parallel with the base,
        wherein the rail member is linearly adjustable in relation to the attachment member.

14. The securing system of claim 13, wherein the rail member comprises at least one first component fastener that securely couples the rail member to the first component, and wherein the attachment member comprises at least one second component fastener that securely couples the attachment member to the second component.

15. The securing system of claim 13, wherein the rail member comprises a rail beam having end walls connected to a ledge extending between the end walls.

16. The securing system of claim 13, wherein each of the coupling brackets comprises:
    end beams connected together by a spanning beam, wherein the surface forms a portion of the end beams and the upper surface forms a portion of the spanning beam, and wherein the corner is a rounded corner; and
    a ledge-engaging arm extending from the spanning beam, wherein the ledge-engaging arm is configured to engage a ledge of the rail member.

17. The securing system of claim 16, wherein the ledge-engaging arm comprises an outwardly-canted tip that conforms to a portion of the ledge.

18. A clip assembly that is configured to adjustably secure to a first component and a second component, the clip assembly comprising:
    a rail member that is configured to connect to the first component and comprising a base, wherein the rail member comprises a rail beam having end walls connected to a ledge extending between the end walls, wherein the rail beam includes recessed areas on either side of the rail beam between the base, the end walls, and the ledge, wherein one or more angled support ribs extend from the base to the recessed areas, wherein the ledge comprises an inwardly-stepped rectangular edge, and wherein the end walls comprise stop barriers; and
    an attachment member that is configured to connect to the second component, wherein the rail member is linearly adjustable in relation to the attachment member, wherein the attachment member comprises a rail coupler having opposed coupling brackets separated by a central gap, wherein the rail beam is slidably retained within the central gap between the coupling brackets, wherein each of the coupling brackets comprises end beams connected together by a spanning beam, and a ledge-engaging arm extending from the spanning beam, wherein the ledge-engaging arm is configured to engage the ledge of the rail member, and wherein the ledge-engaging arm comprises an outwardly-canted tip that conforms to a portion of the ledge.

19. The clip assembly of claim 18, wherein the rail member comprises at least one first component fastener that is configured to securely couple the rail member to the first component, and wherein the attachment member comprises at least one second component fastener that is configured to securely couple the attachment member to the second component.

20. The clip assembly of claim 18, wherein the rail member further includes a circumferential seal over the base.

\* \* \* \* \*